Patented Dec. 1, 1931

1,834,250

UNITED STATES PATENT OFFICE

MARTIN L. MARCUS, OF WOODBURY, AND EDMUND H. BECKER, OF WATERBURY, CONNECTICUT

COPPER OXIDE CELL

No Drawing.   Application filed April 22, 1930. Serial No. 446,411.

This invention relates to copper oxide cells; and it comprises an electric cell of an ordinary type having an alkaline electrolyte and utilizing copper oxide as a depolarizer, said cell containing a small amount of an iodid or of an iodin compound and having a lower shelf loss or longer shelf life; all as more fully hereinafter set forth and as claimed.

The most reliable type of primary cell for closed circuit work is a cell using copper oxide as a depolarizer with a caustic soda electrolyte; this kind of cell being sometimes known as the Lalande type. The opposing poles are zinc and copper and copper oxide as a body or as a mass of fragments is used as a depolarizer. Sometimes the depolarizer is largely cuprous oxide, sometimes it is largely cupric. Unfortunately these cells are subject to rapid deterioration on standing on open circuit; a deterioration which is usually called shelf loss. This is a source of annoyance in many applications of these copper oxide cells and particularly where use of current is intermittent or discontinuous, as in telegraphy and telephony.

While copper oxide is fairly insoluble in caustic soda solutions it is not absolutely so, and with time on open circuit copper goes into the electrolyte in solution or colloidal suspension, or both. And with a cell of this type standing on open circuit the internal resistance of the cell increases, which decreases the efficiency of the cell. Whether this increase in internal resistance is due to the action of the caustic soda solution on the depolarizer or to the fouling of the zinc with precipitated copper, or both, is not definitely known and it is immaterial for the present purposes. That the solution does act on the copper oxide is known and that copper is precipitated on the zinc is also known.

Many expedients have been tried in the past for restraining the migration of copper into the electrolyte and many of these are more or less effective. But in general they require modifications in the cell so that it no longer meets the rigid specifications of the railways and other large users of primary cells. Little departure from the standardized types is permitted.

It is an object of the present invention to provide a standard type cell, that is a cell which will pass the regular commercial specifications and which nevertheless has a lower "shelf loss"; that is, is adapted to stand longer on open circuit without deterioration than is the case with the ordinary cells. This object is accomplished in the present invention by providing a small quantity of iodin, an iodid or an iodin compound in the system. Iodin or cuprous iodid may be incorporated with the depolarizer or iodid may occur in the caustic soda of the electrolyte. The amount required is quite small. The iodin equivalent of 10 or 12 grams of sodium iodid often suffices in an ordinary cell.

As is well known, the standard Lalande type cell contains an alkaline electrolyte free from sulfur compounds. In fact specifications for the caustic soda used in this type cell generally specify that this material be free from sulfur. It is obvious therefore that the iodin compound used in our invention should be sulfur-free.

Some types of cells are customarily put on the market in a dry condition, the cell containing caustic soda in dry form and a mineral oil intended to act as a floating cover to the electrolyte in operation. Upon addition of water the cell is ready for operation. Under the present invention iodin or an iodid may also be present in some dry form. Dry sodium iodid may be added to the caustic soda in assembling the cell; or a pellet of the dry iodid may be added in assemblage. The copper oxide may be treated with a solution of iodin or an iodid and dried, or the depolarizing body may be fumed with elemental iodin. Either treatment probably forms some cuprous iodid in the depolarizer. Sodium or potassium iodid or any other convenient iodin compound may be ground together with the caustic soda. It is possible to mix iodid with fused caustic soda prior to solidification. The particular way in which the iodin compound gets into the system is not here particularly material.

As to the nature of the actions occurring because of the addition of iodin or iodid nothing is known; it is sufficient here to note the fact of an improvement in the operation of the cell. Iodin increases the efficiency of the cell on intermittent work so that its capacity on this kind of service is practically equal to the ordinary cell on continuous discharge; a condition that hertofore has never been approached by a cell of the copper oxide type. In the presence of iodin, the regularity of action is increased and particularly as regards the depolarizer in which reduction goes on smoothly and uniformly without reoxidation of the copper formed in the cell action. Our invention therefore greatly increases the field of use or of adaptability of this type of cell.

An addition of iodin is as operative with an electrolyte of caustic potash or of caustic potash containing lithia, as with caustic soda.

What we claim is:

1. A cell of the usual "Lalande" type having an alkaline electrolyte and containing a small proportion of an alkaline metal iodid.

2. A cell of the usual "Lalande" type having an alkaline electrolyte and containing a small proportion of sodium iodid.

3. A cell of the usual Lalande type having an alkaline electrolyte free from sulfur compounds and containing a small proportion of iodin.

4. A cell of the usual Lalande type having an alkaline electrolyte and containing a small proportion of cuprous iodid.

5. A cell of the usual Lalande type having an alkaline electrolyte free from sulfur compounds, said electrolyte containing a small proportion of a sulfur-free iodin compound.

In testimony whereof, we have hereunto affixed our signatures.

MARTIN L. MARTUS.
EDMUND H. BECKER.